(12) United States Patent
Witt

(10) Patent No.: US 10,856,517 B2
(45) Date of Patent: Dec. 8, 2020

(54) CHEESE-MELTING AND SHAPING DEVICE

(71) Applicant: Michael Harold Witt, Venice, CA (US)

(72) Inventor: Michael Harold Witt, Venice, CA (US)

(73) Assignee: Michael Harold Witt, Venice, CA (US)

( * ) Notice: Subject to any disclaimer, the term of this patent is extended or adjusted under 35 U.S.C. 154(b) by 418 days.

(21) Appl. No.: 15/397,294

(22) Filed: Jan. 3, 2017

(65) Prior Publication Data

US 2018/0184612 A1 Jul. 5, 2018

(51) Int. Cl.
*A01J 27/04* (2006.01)

(52) U.S. Cl.
CPC .................... *A01J 27/04* (2013.01)

(58) Field of Classification Search
USPC ............... 99/506; 219/725; 249/117, 155; 426/512
See application file for complete search history.

(56) References Cited

U.S. PATENT DOCUMENTS

| | | | | |
|---|---|---|---|---|
| 2,027,296 | A * | 1/1936 | Stuart | A21B 3/131 126/39 M |
| 4,692,341 | A * | 9/1987 | Ikeuchi | A23L 17/70 426/250 |
| 4,931,301 | A * | 6/1990 | Giuseppe | A21B 5/026 249/122 |
| 5,226,352 | A * | 7/1993 | Savage | A21B 3/13 249/144 |
| 5,400,698 | A * | 3/1995 | Savage | A21B 3/13 249/144 |
| D392,786 | S * | 3/1998 | Kieser | D1/124 |
| 5,795,613 | A * | 8/1998 | Scharfmann | A23C 19/06 426/237 |

(Continued)

FOREIGN PATENT DOCUMENTS

JP 35605844 * 10/1979

OTHER PUBLICATIONS

Sargento Edible Parmesan Bowls; https:\\web.archive.org\web\20160811\\www.sargento.com/recipes (Year: 2016).*

(Continued)

*Primary Examiner* — Nina Bhat

(57) ABSTRACT

A device for melting cheese in a microwave or oven and then shaping the melted cheese into a bowl-shape form as it cools and hardens to contain salads, snacks, eggs, and the like. The self-supporting base component has dowel-affixing mechanisms to couple a sheet of non-stick flexible heat-resistant material taut over the hollow center of the self-supporting base. A layer of cheese is placed on the sheet of non-stick flexible heat-resistant material and melted in a microwave or oven. Once melted and removed from the microwave or oven, the sheet of non-stick flexible heat-resistant material is decoupled and the bowl-shape form is pressed into the melted cheese on the sheet of non-stick flexible heat-resistant material and into the void beneath the self-supporting base component, conforming the cheese to the bowl-shape form. The cheese cools and hardens permanently taking on the bowl shape.

11 Claims, 4 Drawing Sheets

(56) References Cited

U.S. PATENT DOCUMENTS

| | | | | |
|---|---|---|---|---|
| 7,008,655 B1* | 3/2006 | Aslanis | ............... | A21B 5/026 |
| | | | | 426/100 |
| 7,201,358 B2* | 4/2007 | Nichols | ............... | A21B 3/13 |
| | | | | 220/573.1 |
| 8,252,357 B2* | 8/2012 | Sasaki | ............... | A21B 5/02 |
| | | | | 426/499 |
| 2006/0110518 A1* | 5/2006 | Thompson | ......... | A23C 19/0688 |
| | | | | 426/582 |

OTHER PUBLICATIONS

Parmesan and Romano Edible Cheese Bowls, Monica Matheny; https:\\web.archives.org\web\20120715..www.theyummylife.com (Year: 2012).*

* cited by examiner

CHEESE-MELTING AND SHAPING DEVICE

CROSS-REFERENCE TO RELATED APPLICATIONS

This application claims the benefit of provisional patent application Ser. No. 62/275,019, filed 2016 Jan. 5 by the present inventor.

BACKGROUND—PRIOR ART

The following is a tabulation of some prior art that presently appears relevant:

| U.S. Patents | | | |
| --- | --- | --- | --- |
| Patent Number | Kind Code | Issue Date | Patentee |
| 5,072,664 | A | 1991 Dec. 17 | Tienor et al. |
| 5,756,976 | A | 1998 May 26 | Akasaka |

| U.S. Patent Application Publications | | | |
| --- | --- | --- | --- |
| Publication Nr. | Kind Code | Publ. Date | Applicant |
| 20120097668 | A1 | 2012 Apr. 26 | McGuiness |

Meals are often prepared to not only provide nutritious sustenance, but to have appeal to a human's multitude of senses, namely taste (gustaoception), sight (ophthalmoception), and smell (olfacoception) to create a desire to ingest the contents of the meal.

Professional chefs undergo special training and have tools that the average household does not have access to or understanding of in order to prepare meals in such a fashion to make them extremely appealing to the senses of taste, sight, and smell. A non-professional chef, or home cook, can learn to create such appealing meals as those created by a professional chef, but oftentimes, chefs create meals without revealing their knowledge on how it was created. The cost and size of the equipment used in such meal creation is also often prohibitive for average private household use.

No matter the type of restaurant, the food created needs to have appeal to human senses in order to sell it. Tienor et al. discloses a complex apparatus for taking a flexible food item, such as a tortilla, and transform it into a rigid, bowl-shaped shell for holding food as a method for creating appeal to salads, which has become commonly known as a "Taco Salad."

The act f transforming a flexible tortilla into a rigid, bowl-shaped shell for holding food, such as a salad, became popular giving salads served in them mass appeal. However, the complex apparatuses designed for restaurant use, such as that of Tienor et al., limited private in home use.

A simple solution to overcoming the cost and operational knowledge barriers to the apparatus disclosed by Tienor et al. allowing mass use in private households is a microwaveable tortilla bowl-making device that Akasaka discloses. This device utilizes microwave ovens commonly found in households, removing the need for submersing a tortilla in hot cooking oil to create a tortilla bowl to make meals more appetizing by appealing to the senses.

While there have been improvements to the simple microwaveable tortilla bowl making device that Akasaka discloses, such as the apparatus and system for cooking ribbed tortilla bowls in a microwave as disclosed by McGuiness, because of their nature which includes trans-fats, tortillas are considered by many to be unhealthy. While there is increased appeal to a human's senses to want to consume a salad when placed in a tortilla bowl, it has become counterintuitive to place healthy food such as a salad inside of a tortilla bowl.

As demonstrated with the tortilla bowl and by what Akasaka discloses, simple cooking devices can be created based on cooking trends developed by chefs with expensive, complicated commercial equipment. However, it is difficult to find simple cooking devices where unhealthy foods, such as tortillas, are substituted out and healthier foods can be shaped to create rigid edible bowls to enhance meals, making them more appetizing to a human's senses.

SUMMARY

In accordance with one embodiment a device for melting cheese and shaping the cheese into a rigid bowl-shape form comprises a self-supporting base component, a sheet of non-stick flexible heat-resistant material and a bowl-shape form.

Advantages

Accordingly several advantages of one or more aspects are as follows: to provide a device for melting cheese in a microwave or oven and forming it into a rigid bowl-shape form that is simple to use, that enhances a meal's appeal to a human's senses of sight, smell, and taste, that is a healthier option than other bowls made of food, such as the tortilla bowl, that reduces the risk of getting burned while shaping hot cheese, that provides a way to contain one aspect of a meal on a plate apart from another, that enhances a snack's appeal, that enhances a dessert's appeal, that offers a healthier option to other food-shaped bowls, such as the tortilla bowl, and that offers a unique way of incorporating more calcium, vitamins, and minerals into one's diet. Other advantages of one or more aspects will be apparent from a consideration of the drawings and ensuing description.

BRIEF DESCRIPTION OF THE DRAWINGS—FIGURES

Figure 1:
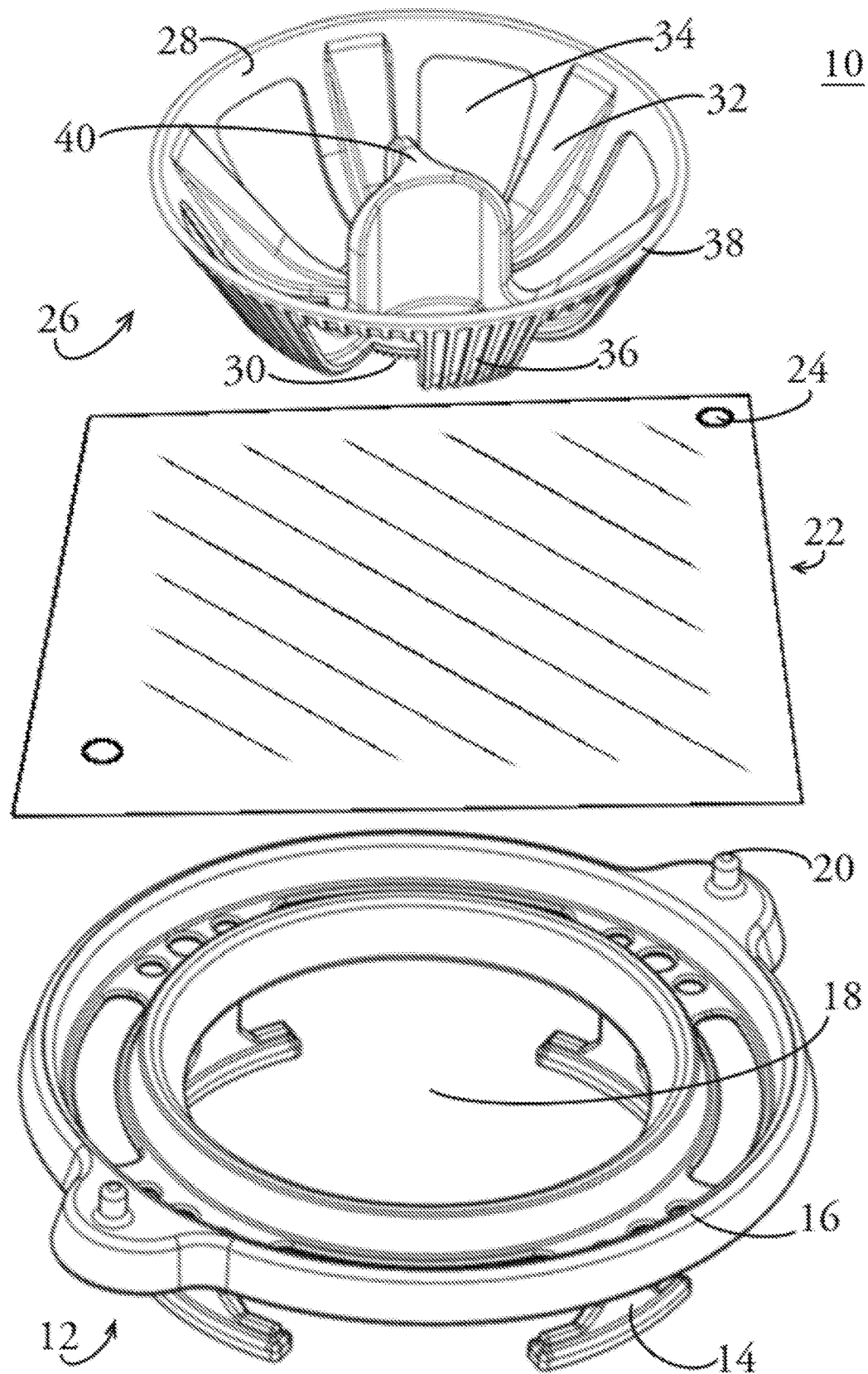
FIG. 1 is an isometric view of one embodiment of the cheese-melting and shaping device according to an exemplary embodiment of the present invention.
Figure 2:
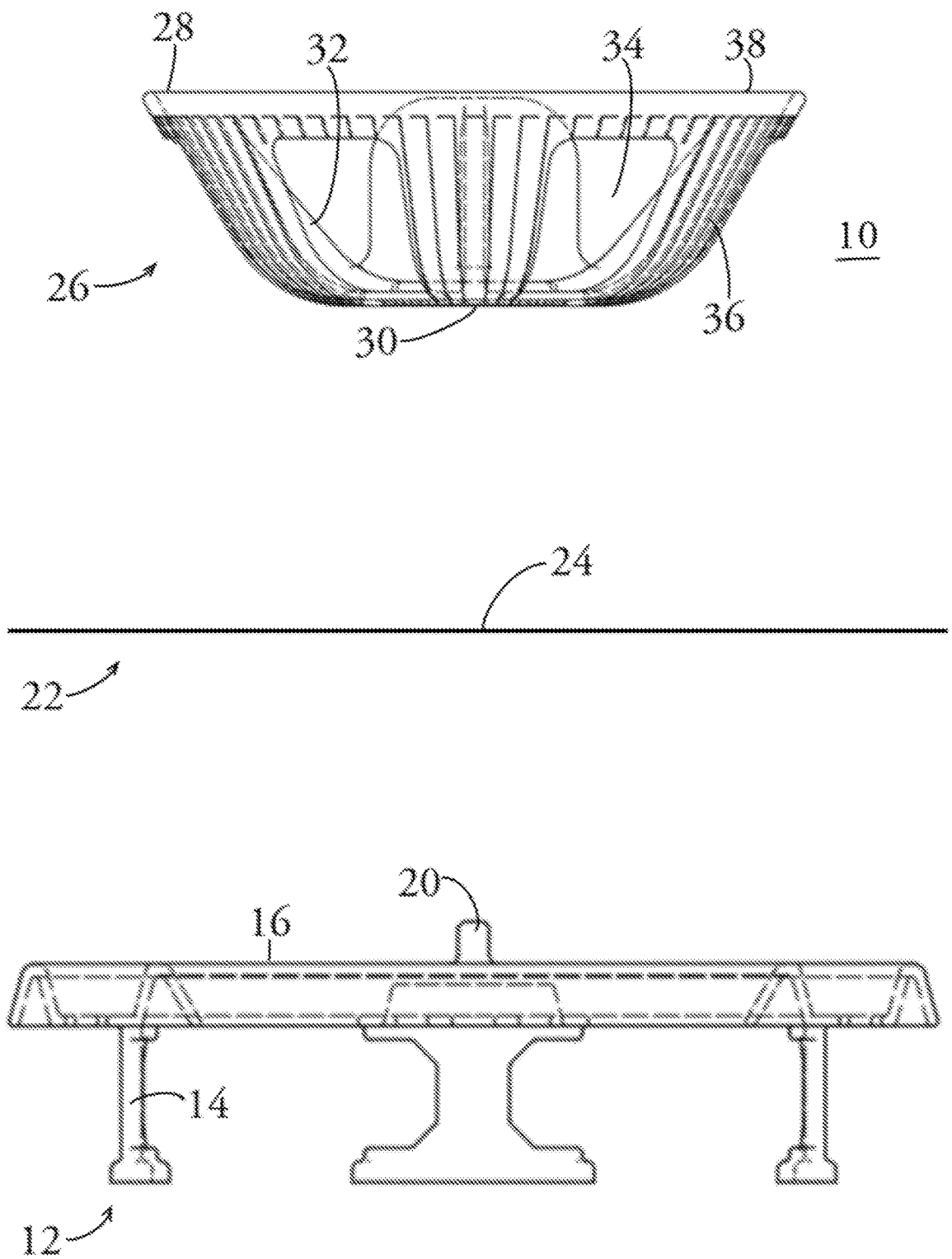
FIG. 2 is a side view of the cheese-melting and shaping device shown in FIG. 1.
Figure 3:
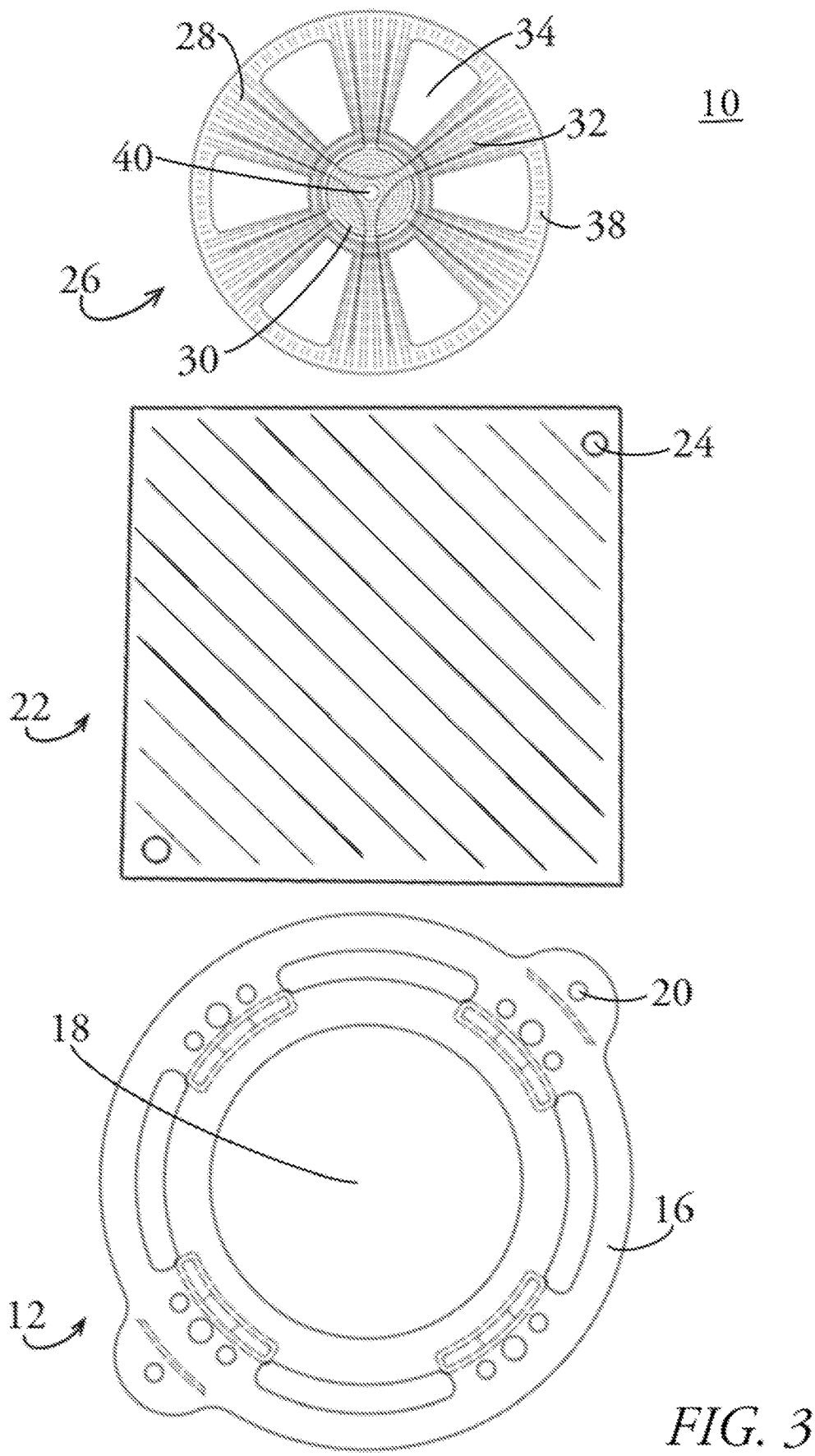
FIG. 3 is a top view of the cheese-melting and shaping device shown in FIG. 1.

| Drawings - Reference Numerals | |
| --- | --- |
| 10 cheese-melting and shaping device | 12 self-supporting base component |
| 14 elongated support member | 16 plate-like horizontal surface |
| 18 hollow center | 20 dowel-affixing mechanism |
| 22 sheet of non-stick flexible heat-resistant material | 24 hole |
| 26 bowl-shape form | 28 upper peripheral rim |
| 30 striated surface | 32 center post |
| 34 cylindrical sidewall | 36 vertically disposed slot |

DETAILED DESCRIPTION

Referring now to the drawings in detail and in particular to FIGS. 1, 2, 3, and 4 reference character 10 generally designates an example embodiment of the cheese-melting and shaping device of the preset invention. The cheese-melting and shaping device 10 according to the present invention generally comprises a self-supporting base component 12, a sheet of non-stick flexible heat-resistant material 22 and a bowl-shape form 26.

The cheese-melting and shaping device 10 is preferably constructed of heat-resistant material capable of withstanding temperatures necessary for melting cheese in a microwave or oven and then shaping the melted cheese (not shown) into a bowl-shape form as it cools and hardens.

The cheese-melting and shaping device 10 includes a self-supporting base component 12 having a plurality of elongated support members 14 that provide balance and support and are affixed to the underside of the plate-like horizontal surface 16. The plate-like horizontal surface 16 has a hollow center 18 with an area smaller than the area of the upper peripheral rim 38 of the bowl-shape form 26. The topside of the plate-like horizontal surface 16 on the self-supporting base component 12 has a pair of diametrically opposed dowel-affixing mechanisms 20 that protrude upward.

The pair of diametrically opposed dowel-affixing mechanisms 20 on the self-supporting base component 12 are positioned in such a way as to couple and decouple with the sheet of non-stick flexible heat-resistant material 22. The holes 24 in the sheet of non-stick flexible heat-resistant material 22 are positioned and at the same measurement as the diametrically opposed dowel-affixing mechanisms 20 that protrude upward from the plate-like horizontal surface 16 on the self-supporting base component 12. When the sheet of non-stick flexible heat-resistant material 22 is coupled to the self-supporting base component 12 by the dowel-affixing mechanisms 20, the sheet of non-stick flexible heat-resistant material 22 is held taut over the hollow center 18 of the self-supporting base component 12 so as to be able to support the weight of a layer of cheese (not shown).

The cheese-melting and shaping device 10 includes a bowl-shape form 26 that has an open top end 28, a closed bottom end 30 and a cylindrical sidewall 32 that has vertically disposed slots 34 spaced equally throughout. The underside surface of the bowl-shape form 26 has a striated surface 36 that minimizes surface contact with the melted cheese while shaping it. By minimizing the contact surface area of the underside of the bowl-shape form 26 with the striated surface 30 the melted cheese (not shown) cools and hardens without sticking to the bowl-shape form 26. In this embodiment the bowl-shape form 26 has an upper peripheral rim 38 with an area slightly larger than the area of the hollow center 18 in the self-supporting base component 12 that allows the bowl-shape form 26 to fit into the hollow center 18 so that a minimum area of the upper peripheral rim 38 is exposed when fully inserted. A centrally located handle 40 protrudes up from the inside center of the closed bottom end 30 of the bowl-shape form 26. The handle 40 allows for easy gripping of the bowl-shape form 26 for insertion into and removal from the hollow center 18 of the self-supporting base component 12.

In use the sheet of non-stick flexible heat-resistant material 22 is affixed to the self-supporting base component 12 by aligning the holes 24 in the sheet of non-stick flexible heat-resistant material 22 with the diametrically opposed dowel-affixing mechanisms 20 of the self-supporting base component 12. The sheet of non-stick flexible heat-resistant material 22 is lowered until it rests taut over the face of the plate-like horizontal surface 16 of the self-supporting base component 12. A layer of cheese (not shown) is added to the topside of the sheet of non-stick flexible heat-resistant material 22 sufficiently covering the sheet of non-stick flexible heat-resistant material 22 exceeding the area of the hollow center 18 of the self-supporting base component. The self-supporting base component 12, the affixed sheet of non-stick flexible heat-resistant material 22, and layer of cheese (not shown) are inserted into a microwave or standard oven for a predetermined amount of time to cook. When the predetermined amount of cook time has passed, the self-supporting base component 12, the affixed sheet of non-stick flexible heat-resistant material 22, and layer of melted cheese is removed from the microwave or standard oven. The sheet of non-stick flexible heat-resistant material 22 is then decoupled from the self-supporting base component 12 by lifting the melted cheese (not shown) on the sheet of non-stick flexible heat-resistant material 22 off the dowel-affixing mechanisms 20 of the self-supporting base component 12 by the holes 24 and allowing the sheet of non-stick flexible heat-resistant material 22 to rest relatively centered, relaxed on the topside of the plate-like horizontal surface 16 on the self-supporting base component 12.

Figure 4:
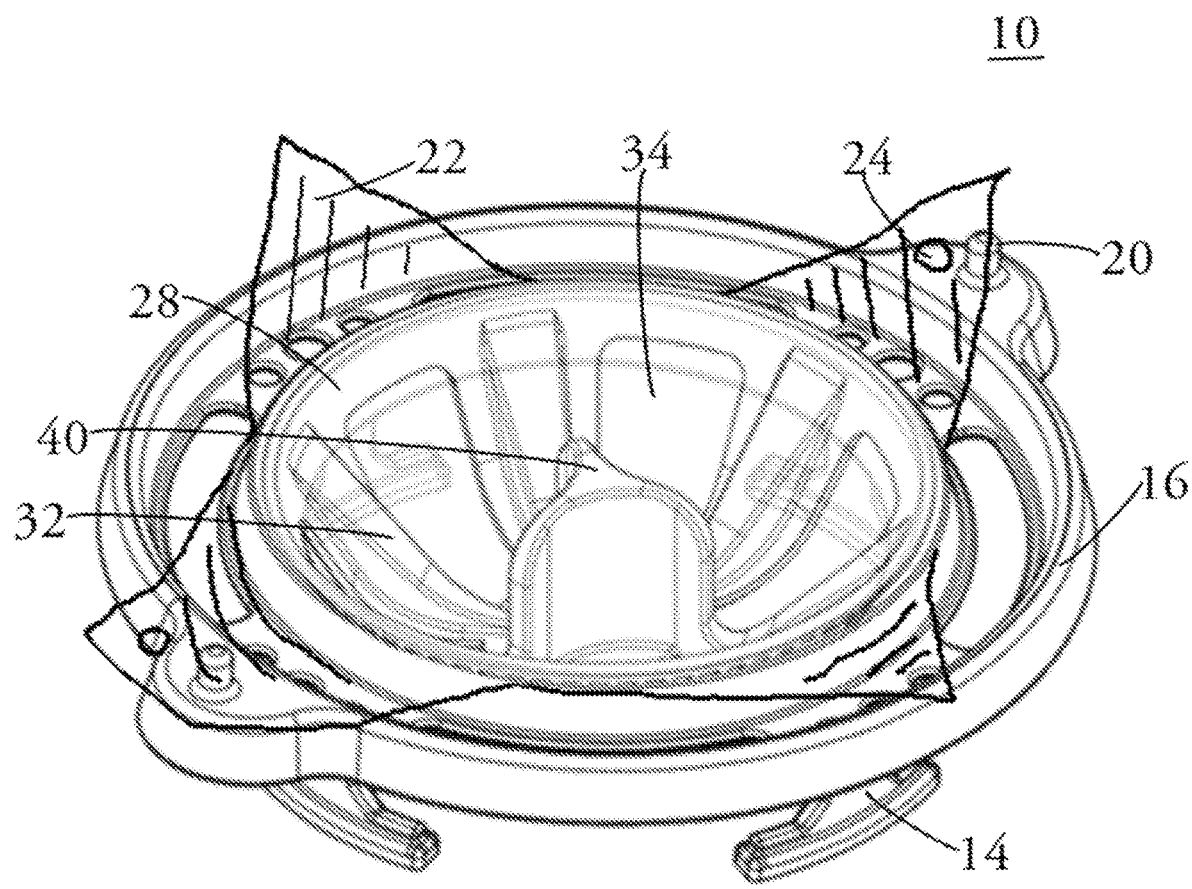
FIG. 4 is an isometric view of the cheese-melting and shaping device shown in FIG. 1.

By gripping the bowl-shape form 26 by the centrally located handle 40, the bowl-shape form 26 is then completely inserted into the hollow center 18 of the self-supporting base component 12. The downward force of the bowl-shape form 26 forces the sheet of non-stick flexible heat-resistant material 22 and the melted cheese on it (not shown) to sandwich between the bowl-shape form 26 and the self-supporting base component 12, causing the sheet of non-stick flexible heat-resistant material 22 and the melted cheese on it (not shown) to conform to the dimensions of the bowl-shape form 26 in the void that exists under the plate-like horizontal surface 16 of the self-supporting base component 12 as shown in FIG. 4. The vertically disposed slots 34 in the cylindrical sidewall 32 of the bowl-shape form 26 allow the heat from the cheese to escape so that it can cool and harden into a bowl-shape.

Once the predetermined time for the cheese to cool and harden passes, the bowl-shape form 26 is removed by gripping the handle 40 and lifting straight up and out of the hollow center 18 of the self-supporting base component 12. The sheet of non-stick flexible heat-resistant material 22 is then removed from the self-supporting base component 12 by lifting it and the cool, rigid, bowl-shaped cheese (not shown) straight up and out. The rigid, bowl-shape cheese (not shown) is peeled from the sheet of non-stick flexible heat-resistant material 22 and ready to be filled with an endless number of foods, including, but not limited to salads, popcorn, eggs, pasta, and the such.

Obviously numerous variations and modifications can be made without departing from the spirit of the present invention. Therefore it should be clearly understood that the forms of the present invention described above and shown in figures of the accompanying drawings are illustrative only and are not intended to limit the scope of the present invention.

I claim:

1. A shaping device for cheese melting comprising:
a form having an open top end and a closed bottom end;
said form including a plurality of equally spaced vertically disposed slots;
an underside of said form having a striated surface;
and a centrally located handle protruding from said closed bottom end towards said open top end.

2. A shaping device for cheese melting according to claim 1 further comprising a base component including an opening configured to receive said form.

3. A shaping device for cheese melting according to claim 2 further comprising a sheet of flexible heat-resistant non-stick material.

4. A shaping device for cheese melting according to claim 2 wherein said base component includes a pair of dowel-affixing mechanisms positioned on opposite sides of said opening.

5. A shaping device for cheese melting according to claim 4 further comprising a sheet of flexible heat-resistant non-stick material having a pair of holes positioned to receive said dowel-affixing mechanisms.

6. A shaping device for cheese melting according to claim 1 further comprising a base component including an opening configured to receive said form; said base component including a plurality of elongated support members extending from an underside of said base component.

7. A shaping device for cheese melting according to claim 6 wherein said base component includes a pair of dowel-affixing mechanisms positioned on opposite sides of said opening.

8. A shaping device for cheese melting according to claim 7 further comprising a sheet of flexible heat-resistant non-stick material having a pair of holes positioned to receive said dowel-affixing mechanisms.

9. A microwaveable cheese mold for melting cheese into a bowl shape comprising:

a press mold including a circular base and striated bowl form which are operatively connected by insert of said bowl form into said circular base;

a circular base having a first side and second side; wherein said first side includes two diametrically opposed protrusions located along the outer circumference of said first side; and a second side including a plurality of feet disposed on said second side to support said base;

said first side including a smaller circumferential hollow center; a sheet of flexible heat resistant material wherein cheese to be molded is deposited thereon; said flexible heat resistant flexible sheet further includes opposing apertures for connection to said protrusions on to said circular base;

said bowl form, includes a plurality of slots and a center portion handle which is in pressing connection with said hollow center on said first side of said circular base.

10. A microwaveable cheese mold for melting cheese into a bowl shape according to claim 9 wherein said bowl-shaped form includes a plurality of equally spaced vertically disposed slots; and a centrally located handle protruding from a closed bottom end towards said open upper rim.

11. A microwaveable cheese mold for melting cheese into a bowl shape according to claim 10 wherein said bowl-shaped form includes an underside having a striated surface.

\* \* \* \* \*